US008923214B2

(12) United States Patent
Tamura

(10) Patent No.: US 8,923,214 B2
(45) Date of Patent: Dec. 30, 2014

(54) BASE STATION, MOBILE STATION, AND MAPPING METHOD OF SUBCARRIERS

(75) Inventor: Koichi Tamura, Tokyo (JP)

(73) Assignee: Lenovo Innovations Limited (Hong Kong), Quarry Bay (HK)

( * ) Notice: Subject to any disclaimer, the term of this patent is extended or adjusted under 35 U.S.C. 154(b) by 548 days.

(21) Appl. No.: 12/674,229

(22) PCT Filed: Aug. 12, 2008

(86) PCT No.: PCT/JP2008/064670
§ 371 (c)(1),
(2), (4) Date: Feb. 19, 2010

(87) PCT Pub. No.: WO2009/025251
PCT Pub. Date: Feb. 26, 2009

(65) Prior Publication Data
US 2011/0044267 A1 Feb. 24, 2011

(30) Foreign Application Priority Data

Aug. 22, 2007 (JP) .................................. 2007-213422

(51) Int. Cl.
H04W 4/00 (2009.01)
H04B 1/59 (2006.01)
H04L 1/00 (2006.01)
H04L 5/00 (2006.01)

(52) U.S. Cl.
CPC ............... *H04B 1/59* (2013.01); *H04L 1/0017* (2013.01); *H04L 5/0007* (2013.01); *H04L 5/0046* (2013.01); *H04L 1/0026* (2013.01); *H04L 2001/0098* (2013.01)
USPC ........................... 370/329; 370/328; 370/330

(58) Field of Classification Search
USPC .................. 370/206, 328, 329, 437; 455/103, 455/452.2, 506, 522; 375/265
See application file for complete search history.

(56) References Cited

U.S. PATENT DOCUMENTS

| 2003/0128769 A1* | 7/2003 | Kim et al. ..................... 375/265 |
| 2004/0219926 A1* | 11/2004 | Kim et al. ................... 455/452.2 |
| 2005/0207355 A1* | 9/2005 | Du ................................. 370/260 |
| 2006/0160498 A1* | 7/2006 | Sudo ............................. 455/103 |

(Continued)

FOREIGN PATENT DOCUMENTS

| EP | 1986347 A1 | 10/2008 |
| JP | 2005-151567 A | 6/2005 |

(Continued)

OTHER PUBLICATIONS

International Search Report for PCT/JP2008/064670, mailed Nov. 18, 2008.

(Continued)

*Primary Examiner* — Andrew Lai
*Assistant Examiner* — Jamaal Henson
(74) *Attorney, Agent, or Firm* — Sughrue Mion, PLLC

(57) ABSTRACT

In order to cope with changes of communication environments of subcarriers and effectively use the subcarrier with channel quality information in a wireless communication system, a base station identifies a condition of a communication environment between the base station and a mobile station based upon channel quality information transmitted from the mobile station and maps transmission information on control of communication selectively to a specified subcarrier used for transmission based upon the identified condition of the communication environment.

13 Claims, 5 Drawing Sheets

(56) References Cited

U.S. PATENT DOCUMENTS

| | | | |
|---|---|---|---|
| 2006/0217142 A1* | 9/2006 | Inaba | 455/522 |
| 2007/0060178 A1* | 3/2007 | Gorokhov et al. | 455/506 |
| 2007/0070967 A1* | 3/2007 | Yang et al. | 370/342 |
| 2007/0183442 A1* | 8/2007 | Shibata | 370/437 |
| 2007/0189199 A1* | 8/2007 | Nishio | 370/328 |
| 2009/0046694 A1* | 2/2009 | Matsumoto et al. | 370/343 |
| 2009/0298523 A1* | 12/2009 | Ogawa et al. | 455/509 |

FOREIGN PATENT DOCUMENTS

| | | |
|---|---|---|
| JP | 2006-325264 A | 11/2006 |
| WO | 2005/020488 A | 3/2005 |
| WO | 2007/091677 A | 8/2007 |
| WO | 2007/119452 A | 10/2007 |

OTHER PUBLICATIONS

3GPP TSG RAN WG1 Meeting #47 R1-063208, "Signalling discontinuous localised allocation in E-UTRA downlink", NEC Group, Nov. 10, 2006.

3GPP TSG RAN WG1 Meeting #48 R1-070709, "The Multiplexing scheme for downlink distributed transmission and localized transmission", Nortel, Feb. 16, 2007.

3GPP TSG RAN WG1 Meeting #49bis R1-072676, "Resource element energy settings for data, control and RS", Motorola, Jun. 29, 2007.

Communication dated Oct. 15, 2014, issued by the European Patent Office in counterpart Application No. 08792516.0.

* cited by examiner

BASE STATION, MOBILE STATION, AND MAPPING METHOD OF SUBCARRIERS

TECHNICAL FIELD

The present invention relates to a wireless communication system and mapping of carriers used in wireless communication.

BACKGROUND ART

The communication method being developed as an LTE (Long Term Evolution) by 3GPP (3rd Generation Partnership Project) aims at a high throughput of at least 100 Mbps. Additionally, future traffic is expected to increase along with today's remarkable development of diversification in various communication services. In order to cope with such future traffic, communication methods having a high throughput have also been demanded. For this purpose, many inventions have been made in order to improve a throughput of the entire communication system.

The wireless communication technology has continuously been evolved with the aforementioned inventions and the like. This evolution can be considered as an outcome of the research and development in various fields, including selection of a frequency band of radio waves, transmission methods, encoding/decoding, error control, multiplexing, multiple accesses, efficient use of frequency bands, and the like. Furthermore, the evolution can also be considered as an outcome of the research and development of communication systems as a whole.

In order to efficiently use frequency bands in the above fields, it is necessary to improve the efficiency of mapping subcarriers. Subcarrier mapping is carried out in an HSDPA (High Speed Down-link Packet Access) of the "Release 5" standard or the like. In the HSDPA, a modulation method or an encoding method suitable for high-speed communication is assigned to a channel of good quality, while a modulation method or an encoding method having high stability is assigned to a channel of poor quality. Thus, the communication loss in the entire communication system is reduced by identifying the channel quality and accordingly changing modulation methods and/or encoding methods.

Specifically, if a modulation method for high-speed communication is used in a case where the channel quality is low (the communication environment is bad), many communication errors will occur. Error correction or an error correction process such as request repeat needs to be performed each time an error occurs. Therefore, use of a modulation method in consideration of the communication quality or the like contributes to reduction of the communication loss in the entire communication system.

That is, high-speed communication is not necessarily established in the case where a modulation method capable of high-speed communication or the like is used. It is important to examine the benefit of the entire communication system in consideration of many factors including the channel quality.

For example, if a control signal for communication is lost, the intended purpose of signals (data) correctly received becomes unknown. Thus, the received signals (data) should be discarded eventually. In another example, if part of information for error correction is lost, the receiving process is recognized as failure even though correct signals have been received.

Therefore, when communication of a control signal having high importance (systematic bit) or the like is performed under a more secure environment, a throughput can be improved as a whole.

Meanwhile, in the HSDPA, it is important to conduct mapping of subcarriers (frequency resources) with use of a CQI (Channel Quality Indicator) so as to efficiently control resource mapping for a mobile station.

For example, those techniques are disclosed in Patent Documents 1 and 2.

Patent Document 1 discloses a technique of improving communication efficiency by selecting a transmission schedule depending upon the type of information to be transmitted. Furthermore, Patent Document 1 discloses a technique of selecting a modulation method and an encoding ratio for each subcarrier with use of a table of MCS selection information in which CQIs are associated with encoding ratios.

Patent Document 2 discloses a technique of selecting a subcarrier with use of a CQI and further selecting a modulation method and an encoding method for the selected subcarrier with use of a frequency hopping pattern and the CQI.

Patent Document 1: WO2005/020488
Patent Document 2: Japanese laid-open patent publication No. 2006-325264

DISCLOSURE OF INVENTION

Problem(s) to be Solved by the Invention

However, the technique disclosed in Patent Document 1 cannot cope with changes of channel environments due to fading. In other words, if a communication environment of subcarriers changes, there is a chance that a control signal of high importance is lost.

Furthermore, although the technique disclosed in Patent Document 2 can reduce the influence of frequency variation (frequency fading) of subcarriers with use of a frequency hopping pattern, it cannot cope with frequencies other than predetermined frequency variations (hopping pattern) or changes of channel environments due to fading resulting from locations, time, or the like. In other words, if a communication environment of subcarriers changes due to frequency variations or positional variations (movements), there is a chance that a control signal of high importance is lost.

In order to solve the above drawbacks, an object of the present invention is to provide a base station, a mobile station, and a mapping method of subcarriers that can cope with changes of communication environments of subcarriers and effectively use the subcarriers with channel quality information.

Means to Solve the Problem(s)

In order to achieve the above object, a mapping method of subcarriers according to the present invention is characterized in that a base station identifies a condition of a communication environment between the base station and a mobile station based upon channel quality information transmitted from the mobile station and maps transmission information on control of communication selectively to a specified subcarrier used for transmission based upon the identified condition of the communication environment.

Effects of the Invention

According to the present invention, it is possible to provide a base station, a mobile station, and mapping method of subcarriers that can cope with changes of communication environments of subcarriers and effectively use the subcarriers with channel quality information.

BEST MODE FOR CARRYING OUT THE INVENTION

An embodiment of the present invention will be described based upon FIGS. 1 to 3.

Figure 1:
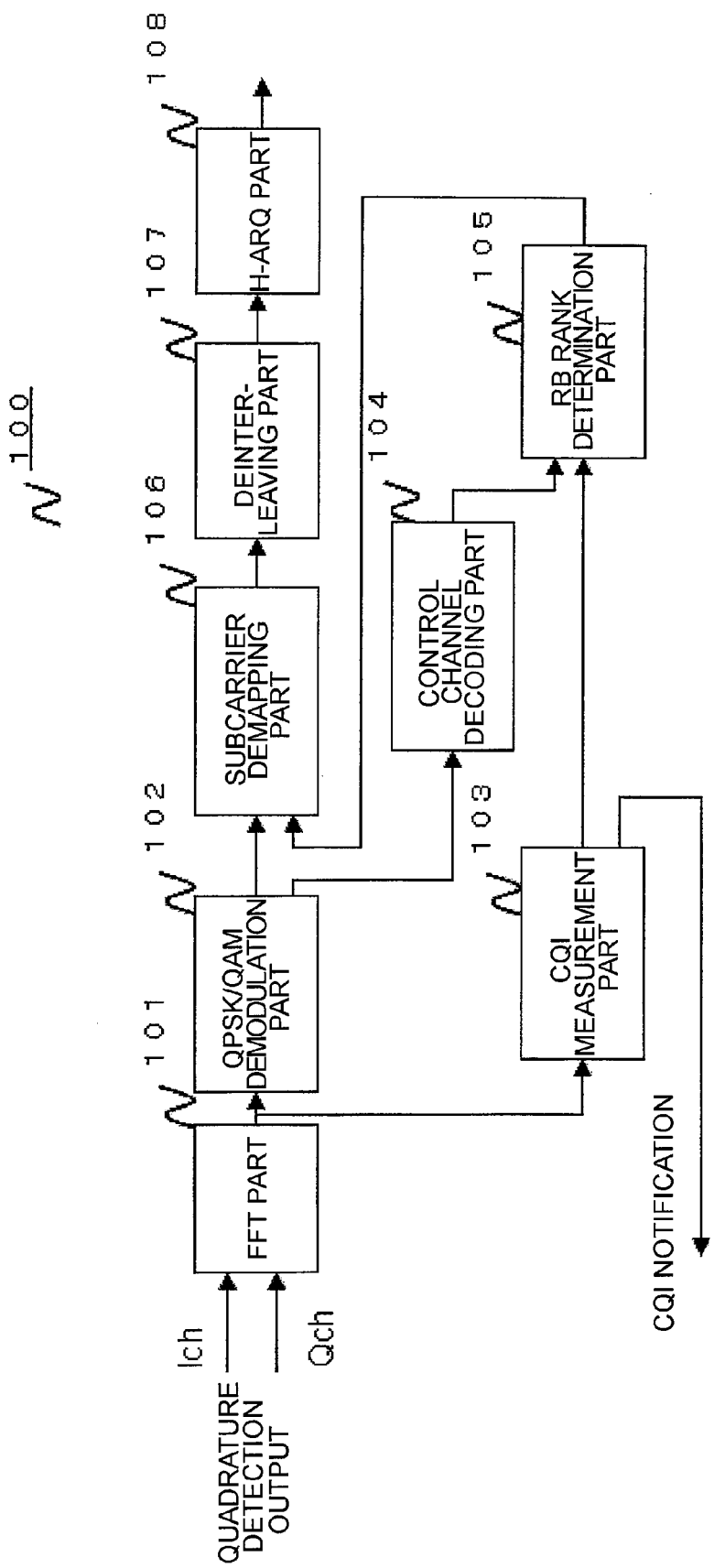
FIG. 1 is a block diagram showing part of a mobile station according to an embodiment.

FIG. 1 is a block diagram showing part of a mobile station 100 according to the embodiment. FIG. 1 is a portion of a general block diagram showing the mobile station and shows features of the present invention.

A FFT (Fast Fourier Transform) part 101 is configured to receive Ich and Qch signals subjected to quadrature detection and transmit subcarrier signals to a QPSK/QAM demodulation part 102 and a CQI measurement part 103.

The QPSK/QAM demodulation part 102 is configured to receive the subcarrier signals, demodulate the subcarrier signals into symbols, and transmit the demodulated symbols to a subcarrier demapping part 106 and a control channel decoding part 104.

The CQI measurement part 103 is configured to receive the subcarrier signals, measure CQIs, transmit the measured CQIs to a base station, and concurrently transmit the CQIs to a RB (Resource Block) rank determination part 105.

The control channel decoding part 104 is configured to decode the subcarrier signals, which have been received from the QPSK/QAM demodulation part 102, into DL-SCH assignment resource block information. The control channel decoding process of the control channel decoding part 104 is the same as that in the prior art and is thus omitted from the explanation.

The RB rank determination part 105 is configured to examine whether the assignment resource blocks include a resource block having a CQI higher than the average CQI by at least a threshold N based upon the assignment resource block information transmitted from the control channel decoding part 104, the average CQI and the CQI of each resource block group transmitted from the CQI measurement part 103, and to transmit the examination result to the subcarrier demapping part 106. The examination process includes a process of examining whether a systematic bit has preferentially been mapped to a specified resource block.

The systematic bit is control information (signals) of a download link, for example, includes information on an encoding method such as convolutional encoding or turbo encoding, a modulation method, error correction, and the like.

The subcarrier demapping part 106 is configured to receive the examination result of the RB rank determination part 105, examine whether the systematic bit has preferentially been mapped to a specified resource block with use of the determination result, and conduct subcarrier demapping in the order of deinterleaving inputs and transmit signals to a deinterleaving part 107 if the systematic bit has preferentially been mapped. Processes subsequent to the deinterleaving part 107 and an H-ARQ part 108 are the same as those in the prior art and are omitted from the explanation.

The base station 200 can be configured in the same manner as in the prior art. Specifically, the base station 200 can have any configuration as long as it can identify a CQI and can map any transmission information to subcarriers.

The communication system including the above configuration can cope with changes of communication environments of subcarriers and can conduct subcarrier mapping with efficient use of subcarriers by using the channel quality information. Next, operation of the communication system will be described.

Description would be made about an operation carried out during communication as an example of the operation. The present invention has features in a subcarrier mapping method using CQI values, and in transmission information carried and mapped to a subcarrier. The method is performed when a downlink to be established between the mobile station and the base station after the mobile station 100 starts communication or after the base station 200 starts communication.

Figure 2:
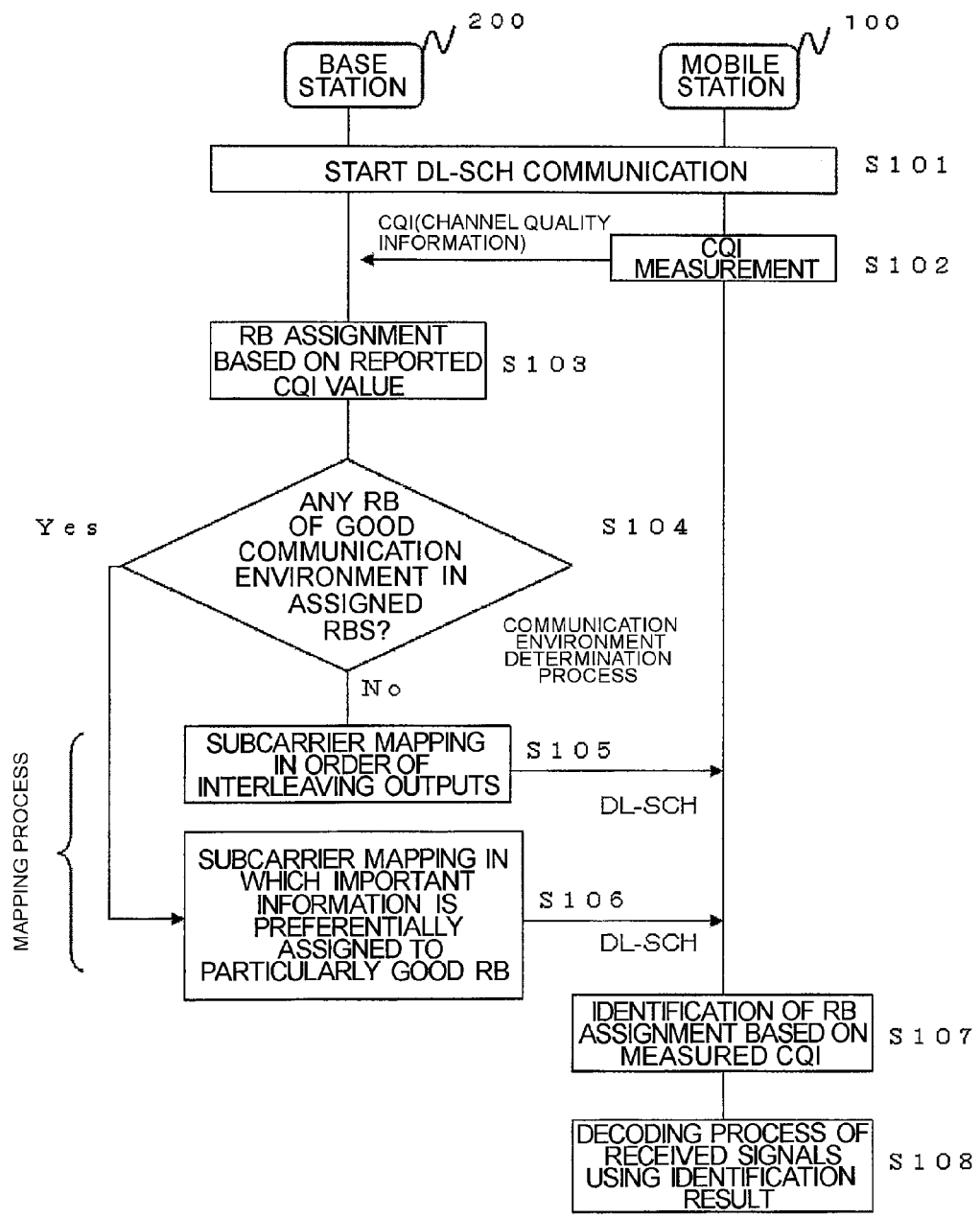
FIG. 2 is a sequence diagram of a communication system, which assigns subcarriers, according to the embodiment.

FIG. 2 is a sequence diagram of the communication system, which assigns subcarriers, according to the embodiment.

After the mobile station 100 starts communication or after the base station 200 starts communication, the mobile station 100 and the base station 200 start DL-SCH communication (Step S101).

The mobile station 100 measures CQIs for each resource block by using the CQI measurement part 103 and CQIs notifies to the base station 200 of the CQIs (Step S102).

The base station 200 performs assignment of resource blocks based on the notification of the CQIs from the mobile station 100 (Step S103).

The base station 200 examines whether the CQI of a specified resource block assigned to the mobile station 100 is higher than the average CQI by at least the threshold N. Specifically, the base station 200 identifies a communication environment (Step S104). The method of identifying a communication environment will be described later in detail with reference to FIG. 3.

If CQIs of all recognized resource blocks are lower than the average CQI plus the threshold N, then the base station 200 conducts subcarrier mapping in ascending order or descending order of frequencies in the order of interleaving outputs and transmits DL-SCH (Step S105). This operation is performed because the base station 200 determines that differences of transmission environments of the resource blocks are small and gives priority to the frequency diversity effects.

If the CQI is equal to or higher than the average CQI plus the threshold N, the base station 200 conducts subcarrier mapping so as to preferentially assign a systematic bit to the resource block with that transmits DL-SCH. In other words, important information is mapped to a resource block of a good communication environment (Step S106). Parity bits and the like are mapped into the rest of the resource blocks (the other resource blocks).

The mobile station 100 receives the DL-SCH transmitted from the base station 200, analyzes control information (control signal) included in the DL-SCH, and identifies a resource block including DL-SCH addressed to the mobile station 100. The mobile station 100 acquires the CQI of the identified resource block by using the CQI measurement part 103 and identifies a CQI that is higher than the average CQI by at least the threshold N among the resource blocks in the RB rank determination part 105 (Step S107).

If the identified results include a resource block having a CQI that is equal to or higher than the average CQI plus the threshold N, then the mobile station 100 determines that a systematic bit has preferentially been mapped to that resource block. If there is no resource block having a CQI that is equal to or higher than the average CQI plus the threshold N, then the mobile station 100 determines that mapping has been conducted in ascending order or descending order of frequencies in the order of interleaving outputs. The mobile station 100 conducts subcarrier demapping on the demodulated signals so as to form input signals for the deinterleaving part 107 based on the identified results (Step S108).

With such a processing method, the base station can transmit the result (method) of subcarrier mapping without transmission of any additional new control signal by using a CQI reported by the mobile station. Specifically, it is possible to attain the same advantages as advantages of notification of control information on subcarrier mapping. Therefore, the communication can be stabilized.

Furthermore, since no additional new control signal is transmitted, no overhead is produced. In other words, efficient communication can be achieved.

Moreover, priority of a resource block of a good receiving environment or priority of frequency diversity effects can adaptively be selected by using a difference between the average CQI and the transmitted CQI as a threshold for control or execution. Therefore, good communication characteristics can be achieved.

Furthermore, since a systematic bit is mapped to a resource block of a good communication environment, good communication characteristics can be achieved.

Specifically, use of CQIs makes it possible to cope with changes of communication environments of subcarriers due to positional and temporal changes.

Next, identification operation for each resource block that is performed by the base station 200 will be described with reference to FIG. 3.

Figure 3:
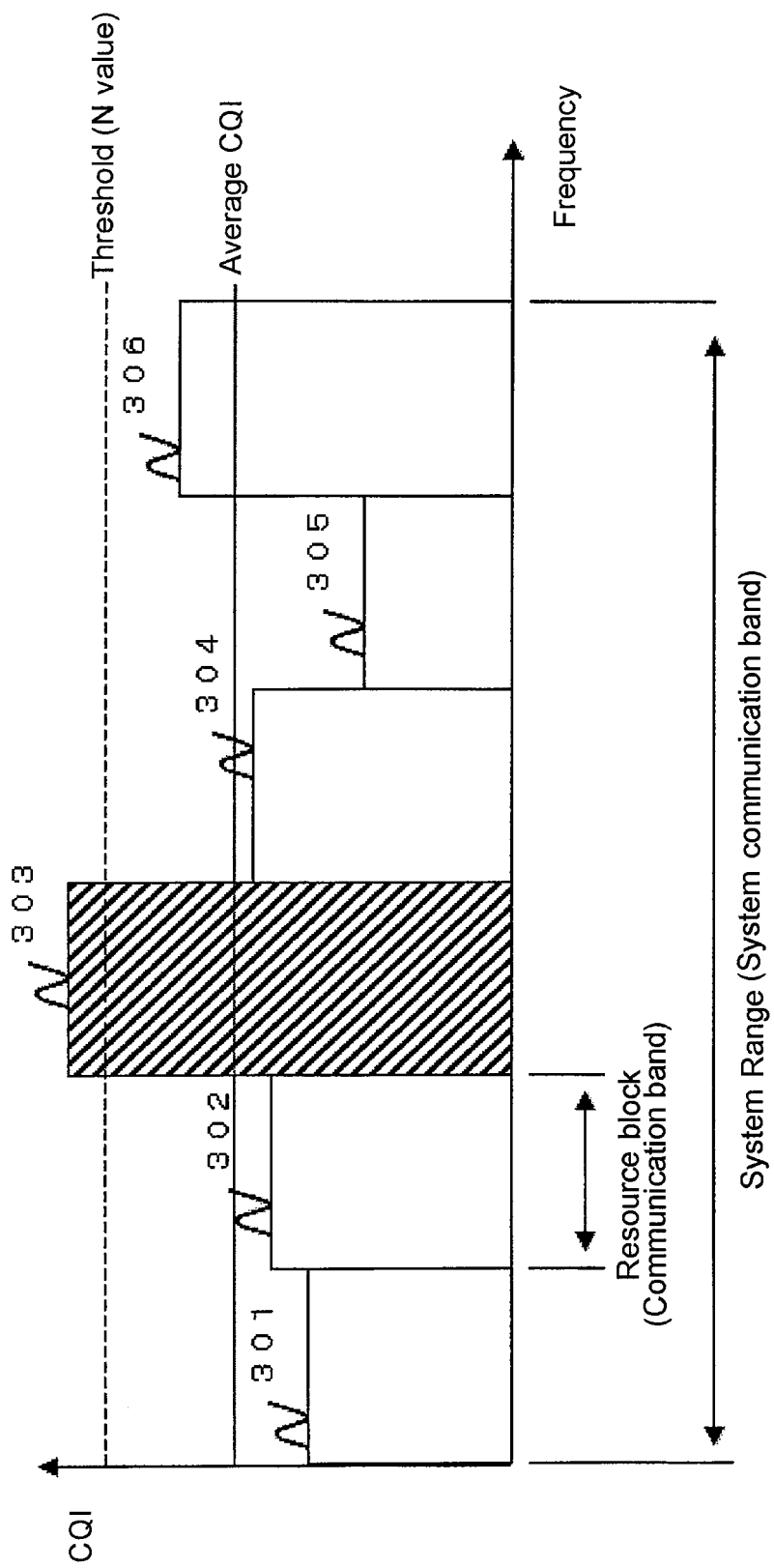
FIG. 3 is an illustrative diagram showing a CQI for each resource block that is transmitted from the mobile station.

FIG. 3 is an illustrative diagram showing a CQI for each resource block that is transmitted from the mobile station 100 and received by the base station 200.

The communication band is divided into resource blocks (groups), which are used as a unit for measuring a CQI. In the example of FIG. 3, the communication band is divided into 6 bands of resource blocks 301 to 306.

In the identification of the resource block of FIG. 2 (Step S104), a threshold is used as a criterion for identification of an assignment resource block(s). First, it is examined whether there is a resource block having a CQI higher than the average CQI by at least the threshold N. If the identification result is "Yes," a systematic bit is preferentially mapped to that resource block. Specifically, in the example of FIG. 3, a systematic bit is preferentially mapped to the shaded resource block 303. If the identification result is "No," a systematic bit is mapped in the order of interleaving outputs.

Another identification method includes determination by whether the CQI is higher or lower than the threshold without using the average CQI. Similarly, the average CQI, higher-order CQIs that are equal to or higher than the average CQI, and the corresponding resource blocks are identified.

In the identification of CQIs, a systematic bit may be assigned to a resource block in descending order of CQIs without using a threshold (or on the assumption that a threshold is equal to zero). Furthermore, determination of a threshold may be made by other methods and is not limited to a specific method.

When resource blocks are identified in this manner, the superiority and inferiority of the CQI information can be determined without overhead required for notification of the CQIs.

In FIG. 2, the CQI notification method has been described based upon the Best-M method. Nevertheless, for example, other notification methods such as a DCT (Discrete Cosign Transform) method may be used.

In the aforementioned embodiment, the mobile station 100 independently identifies a resource block to which a systematic bit has been mapped. However, the base station may transmit information on resource blocks as identification signals.

Figure 4:
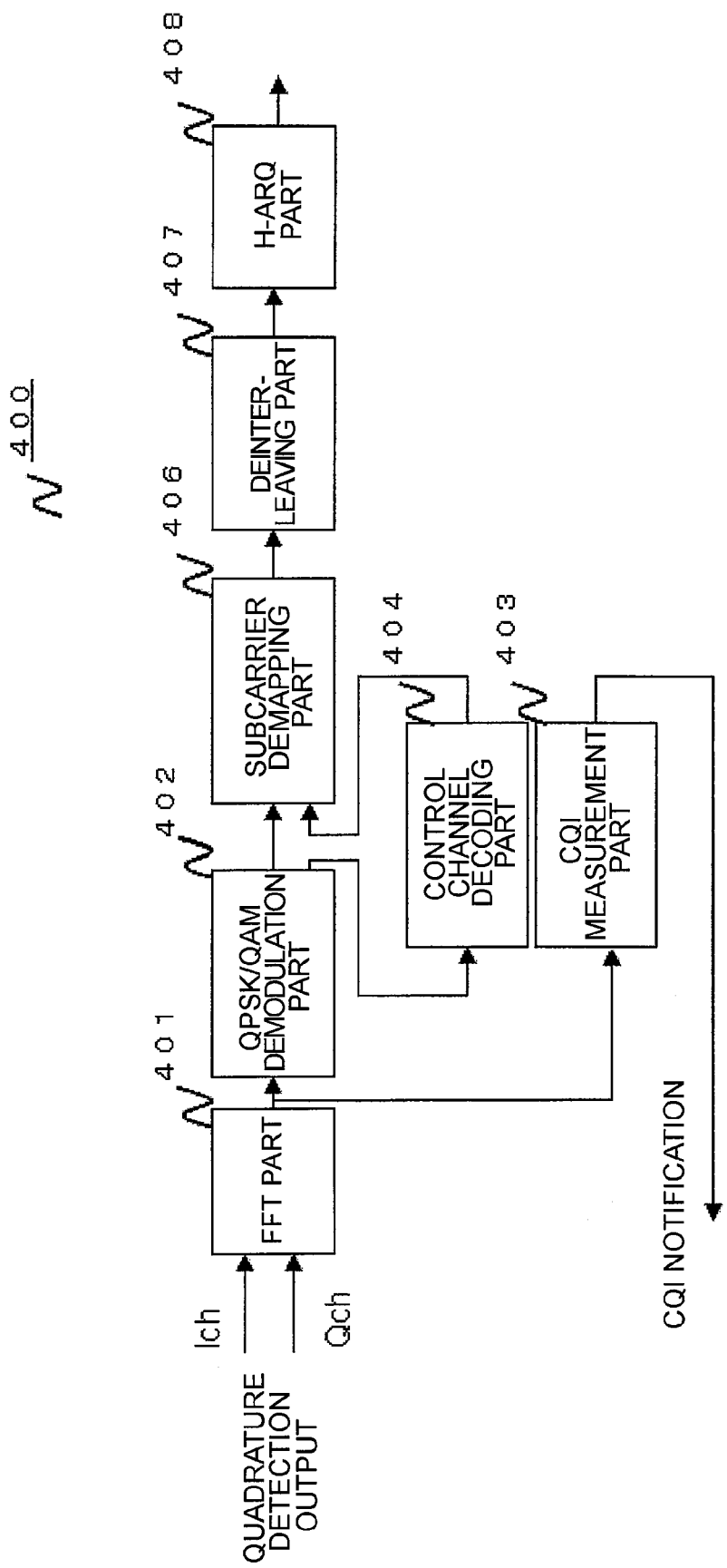
FIG. 4 is a block diagram showing part of a mobile station according to another embodiment.
Figure 5:
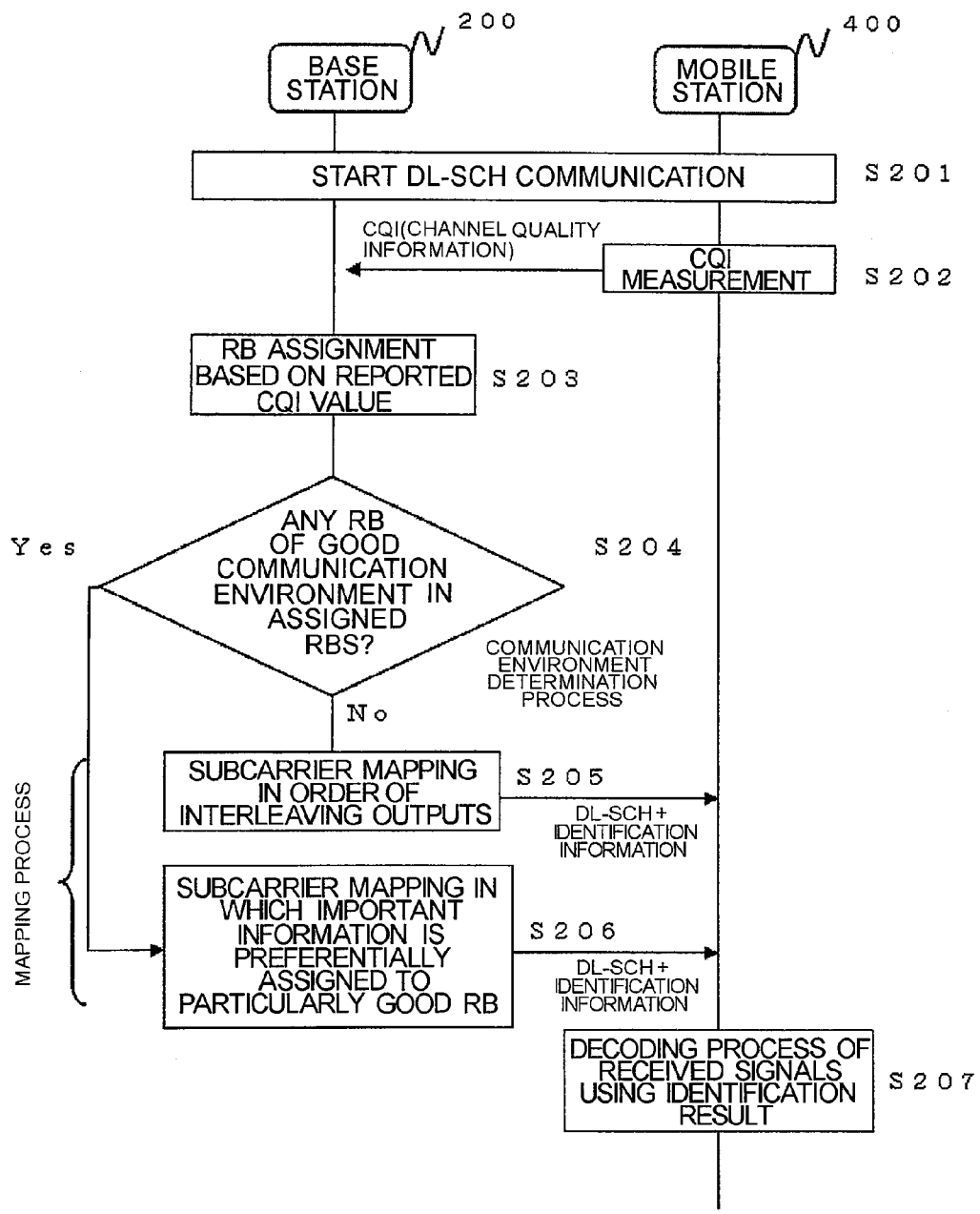
FIG. 5 is a sequence diagram of a communication system, which assigns subcarriers, according to the other embodiment.

Such a case can be shown as in a block diagram and a sequence diagram of FIGS. 4 and 5.

FIG. 4 is a block diagram showing part of a mobile station 400 according another embodiment.

In this configuration, the RB rank determination part 106 has been removed from the aforementioned mobile station 100.

A control channel decoding part 404 of the mobile station 400 is configured to decode subcarrier signals received from a QPSK/QAM demodulation part 402 into DL-SCH assignment resource block information.

A subcarrier demapping part 406 is configured to examine whether a systematic bit has preferentially been mapped into a specified resource block by using resource block information transmitted from the control channel decoding part 404, and conduct subcarrier demapping in the order of deinterleaving inputs and transmit signals to the deinterleaving part 107 if the systematic bit has been mapped.

Other configurations and operations are the same as those of the mobile station 100.

FIG. 5 is a sequence diagram of a communication system, which assigns subcarriers, according to the other embodiment.

Operations from Steps S201 to S203 are the same as those in the sequence diagram of FIG. 2.

In Step S204, the base station 200 performs identification of resource blocks and further generates identification signals. The identification of resource blocks can be performed in the same identification method as in the embodiment.

In Steps S205 and S206, subcarrier demapping is conducted, and DS-SCH to which identification information has been added is transmitted to the mobile station 400.

In Step 207, the mobile station 400 performs a decoding process of the received signals with use of the identification signals.

Other operations are the same as those of the mobile station 100.

According to the present embodiment, while an overhead increases in the control information, the processes in the mobile station can be simplified. Furthermore, the circuit scale can be reduced.

Each component shown in FIGS. 1 and 4 may be implemented by hardware (logic) or may be implemented by using a CPU and software.

Although the present invention has been described with reference to the embodiments, those skilled in the art would understand that various changes can be made to the configurations and details of the present invention within the scope of the claims of the present invention.

The present invention is applicable to a general communication system including a mobile station. Furthermore, the present invention is particularly useful to communication devices using OFDM (Orthogonal Frequency Division Multiplexing) or OFCDM (Orthogonal Frequency and Code Division Multiplexing).

The present application is the National Phase of PCT/JP2008/064670, filed on Aug. 12, 2008, which claims the benefit of priority from Japanese patent application No. 2007-213422, filed on Aug. 20, 2007, the disclosure of which is incorporated herein in its entirety by reference.

The invention claimed is:

1. A mapping method of mapping subcarriers in a base station, comprising:
   identifying a condition of a communication environment between the base station and a single mobile station on the basis of channel quality information transmitted from the mobile station within a plurality of resource blocks assigned to the mobile station composed of a predetermined number of subcarriers in a predetermined communication band;
   judging whether or not the condition of the communication environment is good within the resource blocks assigned to the mobile station in comparison with a predetermined criterion to determine a good resource block, if the good resource block is present within the plurality of the resource blocks assigned to the mobile station;
   preferentially mapping a specific control signal, of a plurality of control signals used for control of communication, selectively to a specified subcarrier within the good resource block, if the good resource block is present within the plurality of the resource blocks assigned to the mobile station, wherein an importance of the specific control signal is different from an importance of other control signals of the plurality of control signals; and
   mapping the plurality of control signals onto subcarriers within the predetermined communication band in a predetermined order of frequencies, if the good resource block is not present within the plurality of the resource blocks assigned for the mobile station.

2. The mapping method of mapping subcarriers as recited in claim 1, wherein:
   the criterion for the base station is whether or not the channel quality information to be identified is higher than a sum of an average of channel quality information of the communication bands assigned to the mobile station and a predetermined threshold.

3. The mapping method of mapping subcarriers as recited in claim 1, wherein the condition of the communication environment is determined by the channel quality information transmitted from the mobile station at every one of the plurality of resource blocks assigned to the mobile station.

4. The mapping method of mapping subcarriers as recited in claim 3, wherein the channel quality information is a channel quality indicator sent from the mobile station at every one of the plurality of resource blocks assigned to the mobile station.

5. The mapping method of mapping subcarriers as recited in claim 1, wherein the specific control signal includes a systematic bit.

6. A base station comprising:
   a unit to identify a condition of a communication environment between the base station and a single mobile station on the basis of channel quality information transmitted from the mobile station within a plurality of resource blocks assigned to the mobile station composed of a predetermined number of subcarriers in a predetermined communication band;
   a unit to judge whether or not the condition of the communication environment is good within the resource blocks assigned to the mobile station in comparison with a predetermined criterion to determine a good resource block, if the good resource block is present within the plurality of the resource blocks assigned to the mobile station; and
   a unit to preferentially map a specific control signal, of a plurality of control signals used for control of communication, selectively to a specified subcarrier within the good resource block, if the good resource block is present within the plurality of the resource blocks assigned to the mobile station and to map the plurality of control signals onto subcarriers within the predetermined communication band in a predetermined order of frequencies, if the good resource block is not present within the plurality of the resource blocks assigned to the mobile station;
   wherein an importance of the specific control signal is different from an importance of other control signals of the plurality of control signals.

7. The base station as recited in claim 6, wherein the condition of the communication environment is determined by the channel quality information transmitted from the mobile station at every one of the plurality of resource blocks assigned to the mobile station.

8. The base station as recited in claim 6, wherein the channel quality information is a channel quality indicator sent from the mobile station at every one of the plurality of resource blocks assigned to the mobile station.

9. The base station as recited in claim 6, wherein the specific control signal includes a systematic bit.

10. A mobile station comprising:
    a unit to acquire channel quality information which is indicative of a communication environment between a base station and the mobile station and which is acquired at every one of resource blocks assigned to the mobile station within a predetermined communication band;
    a unit to monitor the resource blocks sent from the base station to detect a specific one of the plurality of resource blocks assigned to the mobile station with reference to the channel quality information;
    a unit to preferentially identify a specific control signal, of a plurality of control signals, which is received through the specific one of the plurality of resource blocks assigned to the mobile station from the base station on the basis of a result of detecting the specific one of the plurality of resource blocks assigned to the mobile station, when the specific one of the plurality of resource blocks assigned to the mobile station is found out;
    wherein an importance of the specific control signal is different from an importance of other control signals of the plurality of control signals.

11. The mobile station as recited in claim 10, wherein:
    when the control signal is mapped on the specific one of the plurality of resource blocks assigned to the mobile station, the control signal is determined by searching for subcarriers included in the specific one of the plurality of resource blocks assigned to the mobile station.

12. The mobile station as recited in claim 10, wherein:
    the channel quality information is a channel quality indicator (CQI).

13. The mobile station as recited in claim 10, wherein:
    the specific control signal includes a systematic bit.

\* \* \* \* \*